March 10, 1970  E. E. ROBBINS  3,499,770

FOAM BREAKING

Filed Oct. 21, 1966

INVENTOR
E. E. ROBBINS

BY Young & Quigg

ATTORNEYS

United States Patent Office 3,499,770
Patented Mar. 10, 1970

3,499,770
FOAM BREAKING
Eldred E. Robbins, Winston-Salem, N.C., assignor to Phillips Petroleum Company, a corporation of Delaware
Filed Oct. 21, 1966, Ser. No. 588,599
Int. Cl. B01d 19/02; B65b 3/22
U.S. Cl. 99—171     5 Claims

ABSTRACT OF THE DISCLOSURE

Foam is passed through a cylindrical constriction and directed against a solid plate surface positioned substantially perpendicularly to the line of flow of the impinging foam, at a velocity sufficiently great to break down the foam. The ratio of the distance between the effluent end of the constriction and the solid plate surface to the diameter of the constriction is in the range of 0.25 to 1.

---

Figure 1:
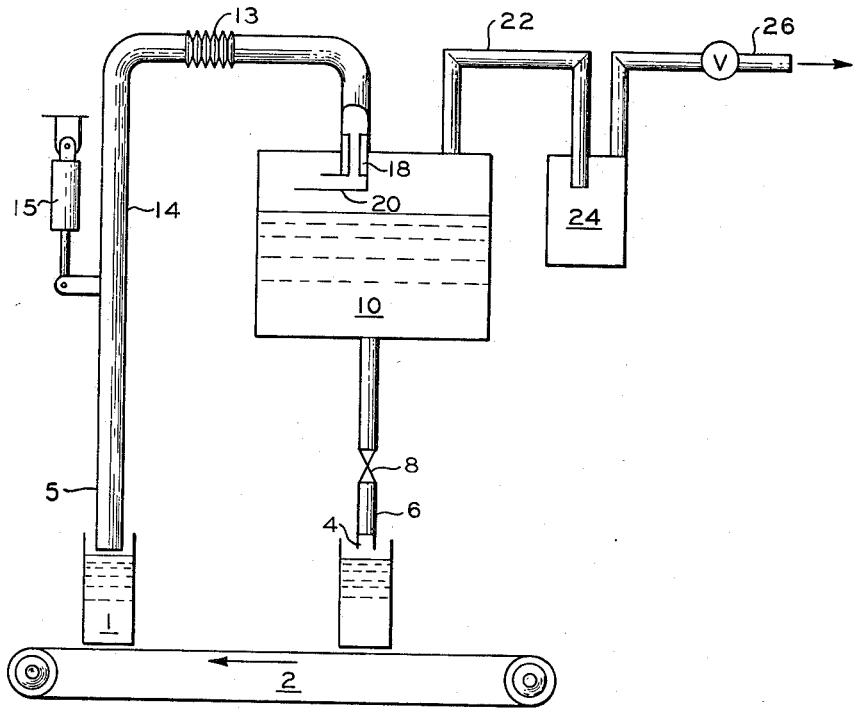

This invention relates to foam breaking. In one of its aspects, it relates to a method and apparatus for converting foam to a liquid by impinging the foam on a surface at such a force that the foam is thereby substantially destroyed and converted to liquid.

A milk filling apparatus for filling paper milk cartons uses one or more sets of piston and valve arrangements to pump a metered volume of milk into the cartons. This method and apparatus create foam on top of the liquid, which foam must be removed prior to the closing of the top of the cartons.

Many methods of breaking foam have been devised. Naucler 2,184,195 discloses a method of breaking foam in which foam is taken from a tank and passed through a pump to increase the pressure thereon and the foam is then sprayed back into the tank through a nozzle which emits the foam in a conical spray so that the individual froth bubbles travel in diverse directions to stretch the froth layer until the bubbles burst. This apparatus, due to the pump, subjects the foam material to contamination and is expensive. Further it is relatively inefficient.

One system for removing foam from the top of milk cartons is to direct a blast of live steam into the carton or in the filler bowl to eliminate rather than remove the foam. This method adequately eliminates the foam but is undesirable because live steam is dangerous. Further, there is some degree of water dilution to the milk, milk particles become cooked and give milk an off-flavor, and this method is expensive to incorporate into a commercial operation.

It was thought that the problem of foam formation in the top of the milk cartons could be overcome by drawing off the foam and returning it to the filler tank. However, the foam builds up in the tank to the point that it discharges from the blower used to draw the foam into the tank and must be trapped in a can. Using this method, about 100 to 200 gallons of milk per day will be trapped; however, this milk cannot be used as premium grade milk but must be reprocessed and used as a by-product.

I have now discovered that milk foam can be broken without loss of quality of material and with a minimum of equipment by impinging the foam against a solid surface at such a velocity that the foam is thereby broken.

By various aspects of this invention one or more of the following or other objects can be obtained.

It is an object of this invention to provide a novel process and apparatus for breaking foam.

It is a further object of this invention to provide a novel process and apparatus for recovering milk foam resulting from the filling of milk cartons.

It is a still further object of this invention to provide an economical process and apparatus for recovering milk foam from a filling operation without loss of quality of the removed product.

Other aspects, objects, and the several advantages of this invention are apparent to one skilled in the art from a study of this disclosure, the drawings, and the appended claims.

According to the invention, a foamed liquid is converted back into the liquid state by impinging the liquid against a surface at such a velocity that the foam is thereby broken. This process is advantageously employed in breaking milk foam which results from filling of milk cartons.

In one embodiment the foam is drawn through a constriction prior to being impinged on the surface. In another embodiment the surface is perpendicular to the direction of flow of the foam at the surface.

Figure 2:
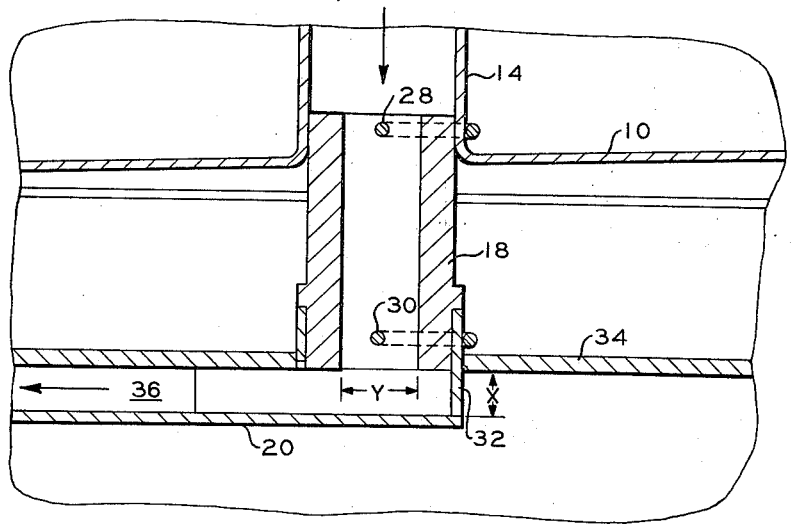

The invention will now be described with reference to the accompanying drawings in which FIGURE 1 schematically shows an embodiment of the invention and FIGURE 2 is a detailed view of a portion of the apparatus schematically shown in FIGURE 1.

Referring now to the drawings, a plurality of cartons 1 traveling on conveyor 2 are systematically filled by filling spout 4 which has supplied to it milk which passes through line 6 from tank 10. A valve 8 is advantageously provided in line 6 to stop the flow of milk into the cartons at fixed periods of time or after a predetermined quantity of milk has been discharged. Milk is maintained in tank 10 at a predetermined level schematically shown in FIGURE 1. After the cartons have been filled and some foam remains on top, valve 8 is closed. The filled carton is then conveyed to a foam removal station and foam removal nozzle 5 is lowered into the carton by means 15 such as an air cylinder and a vacuum source 26 draws foam from carton 1 through nozzle 5, line 14, flexible connection 13 through restriction 18 in line 14, and impinges the foam against surface 20. The impingement of foam against surface 20 is at such a velocity that the foam will be converted to milk and fall back down into the tank. A suitable draw-off conduit 22 with trap-out tank 24 is provided for vacuum source 26.

Referring now to FIGURE 2 wherein a detailed version of the restriction means 18 and plate 20 is seen. As can be seen from the drawing, the restriction means 18 comprises a cylindrical tube through which the foam passes. This restriction increases the velocity of the foam through line 14. Restriction 18 has pin 28 which extends through line 14 to hold restriction 18 in line 14. Another pin 30 attaches to member 32, which is in turn attached to plate 20, and to restriction 18. Member 32, the bottom portion of which is U-shaped, has an outlet at 36. As can be seen from the figure the plate 20 is substantially perpendicular to the line of flow of the foam at plate 20. Other supporting means such as a baffle 34 can be employed to maintain restriction 18 and member 32 in place.

The distance between plate 20 and the end of restriction 18 is designated by the letter X. The diameter of the constriction is designated by Y. The ratio of X to Y can be important in breaking the foam. As is understood by one skilled in the art there is a minimum velocity of the foam which is required, however. This velocity is achieved by the suction means 26. Generally, the suction means must be less than 5, preferably in the range of 8 to 10 inches of Hg below atmospheric pressure. For a suction within the tank below the minimum value and within the preferred range, the ratio of X to Y will advantageously be in the range of .25 to 1, preferably .50 to .60.

Although the invention has been described with relation to impinging the foam against a surface which is perpendicular to the direction of flow at the surface, it is obvious that the surface could be slightly inclined as long as the flow is impinged against the surface at such velocity that the foam is thereby broken. Of course, it is preferred that the surface be perpendicular to the flow of foam so that a minimum velocity will be required.

It has been found that milk foam from milk cartons has been broken very effectively using an apparatus such as that hereinbefore described with the use of an American Blower Company, Size D, centrifugal fan with a 14 inch fan and a 3 inch pipe operating at a speed of 3600 r.p.m. Under these conditions the vacuum pulled in the tank 10 was in the range of 8 to 10 inches of Hg below atmospheric pressure and the velocity of the foam was estimated to be between 40 to 80 feet per second, probably about 60 feet per second.

Whereas the invention has been described with relation to having the impinging surface within the tank, it is obvious that the surface can be without the tank and a conduit can be used to drain the liquid into tank 10 from the surface.

Whereas the invention has been described with relation to breaking milk foam, it is obvious that other types of foams can be broken by the use of the invention. Other foams include beer, soap and the like.

What is claimed is:
1. An apparatus for converting foam to liquid comprising:
   a tank means to hold a quantity of liquid,
   outlet means at the bottom of said tank means to pass liquid from said tank, said outlet means adapted to fill a container,
   conduit means to remove foam from filled containers, said conduit means leading to said tank means,
   a solid plate having a surface thereof positioned substantially perpendicularly to the line of flow of said conduit means,
   means to draw said foam through said conduit means at such a velocity that said foam impinges on said surface and will thereby be converted to liquid,
   a constriction provided within said conduit means adjacent the outlet end thereof and adjacent said surface, the ratio of the distance from the end of said constriction to said surface to the diameter of said constriction being in the range of 0.25 to 1.
2. An apparatus according to claim 1 wherein said surface is within said tank means.
3. A method of converting foam to a liquid which comprises passing said foam through a substantially cylindrical constriction to increase the velocity of the foam passing therethrough and impinging the effluent from said constriction against a solid plate surface positioned substantially perpendicularly to the line of flow of the impinging foam, at a velocity sufficiently great to break down the foam, the ratio of the distance between the effluent end of said constriction and said solid plate surface to the diameter of said constriction being in the range of 0.25 to 1.
4. A method in accordance with claim 3 wherein said ratio is in the range of 0.5 to 0.6, and wherein a vacuum source is used to draw said foam through said constriction.
5. A method in accordance with claim 4 wherein said foam is produced in the filling of cartons with milk, and the milk recoverd from the broken foam is returned to a filling reservoir used in the filling of said cartons.

References Cited
UNITED STATES PATENTS

| 2,753,098 | 7/1956 | Ward | 226—69 |
| 2,948,351 | 8/1960 | Phillips et al. | 183—2.5 |

MAURICE W. GREENSTEIN, Primary Examiner

WARREN BOVEE, Assistant Examiner

U.S. Cl. X.R.

252—361